(12) United States Patent (10) Patent No.: US 7,966,549 B2
Hollenberg et al. (45) Date of Patent: Jun. 21, 2011

(54) ERROR CORRECTED QUANTUM COMPUTER

(75) Inventors: Lloyd Hollenberg, East Hawthorn (AU); Ashley Stephens, Carlton (AU); Andrew Greentree, Coburg (AU); Austin Fowler, Victoria (AU); Cameron Wellard, North Carlton (AU)

(73) Assignee: Qucor Pty. Ltd. (AU)

( * ) Notice: Subject to any disclaimer, the term of this patent is extended or adjusted under 35 U.S.C. 154(b) by 1119 days.

(21) Appl. No.: 11/712,639

(22) Filed: Mar. 1, 2007

(65) Prior Publication Data

US 2008/0185576 A1    Aug. 7, 2008

(51) Int. Cl.
*H03M 13/00* (2006.01)
(52) U.S. Cl. .......................... 714/776; 714/764; 714/820
(58) Field of Classification Search ................... 714/776, 714/764, 820; 257/31, 34, 36
See application file for complete search history.

(56) References Cited

U.S. PATENT DOCUMENTS 7,307,275 B2 * 12/2007 Lidar et al. ...................... 257/31

\* cited by examiner

*Primary Examiner* — Fritz Alphonse
(74) *Attorney, Agent, or Firm* — Wood, Phillips, Katz, Clark & Mortimer

(57) ABSTRACT

The correction of errors in the transport and processing of qubits makes use of logical qubits made up of a plurality of physical qubits. The process takes place on a spatial array of physical qubit sites arranged with a quasi-2-dimensional topology having a first line of physical qubit sites and second line of physical qubit sites, where the first and second lines are arranged in parallel, with the sites of the first line in registration with corresponding sites in the second line. Between the first and second lines of physical qubit sites are a plurality of logic function gates, each comprised of a first physical qubit gate site associated with a first physical qubit site in the first line, and a second physical qubit gate site associated with the physical qubit site in the second line that corresponds to the first physical qubit site. The temporal process comprises a number of steps to achieve movement of the qubits in the array to bring pairs of all the data and ancilla qubits to respective logic function gates over the course of a number of clock cycles. Then achieve the logic operation between each pair of data and ancilla qubits. Move the qubits in the array to bring all the data and ancilla qubits to respective sites where they can be read out. And, using the values of the ancilla qubits read out to correct errors arising in the data qubits they have been gated with.

13 Claims, 20 Drawing Sheets

ERROR CORRECTED QUANTUM COMPUTER

TECHNICAL FIELD

This invention concerns quantum error correction, that is the correction of errors in the transport and processing of qubits, by use of logical qubits made up of a plurality of physical qubits. In particular the invention concerns a method for error corrected computation, and in a further aspect an architecture with operational constraints.

BACKGROUND ART

The Kane paradigm of donor nuclear spin quantum computing in silicon [1] based on single atom placement fabrication techniques, [2,3] is an important realisation of Feynman's original concept of nanotechnology in the solid state. Variations on this theme include electron spin qubits [4-6] and charge qubits [7]. There are also possible realisations for quantum computers being investigated in Ion trap QCCD technologies [14], and GaAs 2e (S-T) qubits [15].

Quantum computers are susceptible to error modes that do not trouble binary digital computers. For instance, gating errors and decoherence errors. Fault-tolerance scale-up requires quantum error correction over concatenated logical qubits with all the attendant ancillas, syndrome measurements and classical feed-forward processing. Both parallelism and communication must be optimized [8]. In general error correction is known to involve the steps of encoding data bits, ancilla syndrome determination and correction, and decoding the error corrected data qubits.

DISCLOSURE OF THE INVENTION

The invention is a process for performing an error corrected quantum logic function on a spatial array of physical qubit sites arranged with a quasi-2-dimensional topology having a fundamental component structure comprising:

A first line of physical qubit sites and second line of physical qubit sites, where the first and second lines are arranged in parallel, with the sites of the first line in registration with corresponding sites in the second line.

Between the first and second lines of physical qubit sites are a plurality of logic function gates, each comprised of a first physical qubit gate site associated with a first physical qubit site in the first line, and a second physical qubit gate site associated with the physical qubit site in the second line that corresponds to the first physical qubit site.

Wherein the temporal process comprises the following steps:

Creating a logical qubit in a section of the array by initializing physical data and ancilla qubits at respective sites of the first and second lines within the section.

Clocking each physical qubit site in the section at the same time.

Permitting the physical data and ancilla qubits to move to an adjacent site in a clock cycle, provided that no site may contain more than one physical qubit at any time.

Controlling the sites to achieve movement of ancilla qubits in the array to bring pairs of the ancilla qubits to respective first and second physical gate sites of logic function gates over the course of a number of clock cycles.

Permitting logic operations to be performed at logic function gates which have both of their gate sites occupied by a physical ancilla qubit.

Controlling the gate sites of the logic function gate to achieve the logic operation.

Controlling the sites to achieve movement of the qubits in the array to bring pairs of all the data and ancilla qubits to respective logic function gates over the course of a number of clock cycles.

Controlling the gate sites of the logic function gate to achieve the logic operation between each pair of data and ancilla qubits.

Controlling the sites to achieve movement of the qubits in the array to bring all the data and ancilla qubits to respective sites where they can be read out. And, Using the values of the ancilla qubits read out to correct errors arising in the data qubits they have been gated with.

Initialization and readout sites may be provided in the first and second lines of sites for the initialization and readout of physical data and ancilla qubits.

Transport sites may be provided in the first and second lines of sites and between the first and second lines of sites and gate sites.

Transport of physical qubit between initialization, readout and gate sites may take place by a mechanism involving coherent transport by adiabatic passage (CTAP), or by logical SWAP operations, or direct electric field induced transport.

Any of the universal set of logic operations may be used, and in particular but not exclusively:
  CNOT,
  hadamard control+CNOT,
  CNOT+hadamard control,
  hadamard target+CNOT+hadamard target
  hadamard target+CNOT+SWAP+hadamard target
  SWAP
  and other universal gates as required.

The logical qubits may be constructed using a Steane code [13], for instance having seven or nine physical qubits for each logical qubit. A Steane error correcting circuit may also be used as the framework for the error correcting process.

The component structures themselves may be arranged in a tiled two dimensional layout as required allowing for classical control components.

The qubits may be realised in silicon as nuclear spin qubits, electron spin qubits or charge qubits. In addition they may be realised in Ion trap QCCD technologies or as GaAs 2e (S-T) qubits, or as superconducting qubits.

In a further aspect the invention is a fundamental component structure of a quasi-2-dimensional quantum computer architecture for performing an error corrected quantum logic function, the structure comprising:

A first line of physical qubit sites and second line of physical qubit sites, where the first and second lines are arranged in parallel, with the sites of the first line in registration with corresponding sites in the second line.
  Initialization and readout sites are provided in the first and second lines of sites for the initialization and readout of physical data and ancilla qubits.
  Between the first and second lines of physical qubit sites are a plurality of logic function gates, each comprised of a first physical qubit gate site associated with a first physical qubit site in the first line, and a second physical qubit gate site associated with the physical qubit site in the second line that corresponds to the first physical qubit site.
  Transport sites are provided in the first and second lines of sites and between the first and second lines of sites and gate sites.

BRIEF DESCRIPTION OF THE DRAWINGS

An example of the invention will now be described with reference to the accompanying drawings, in which.

BEST MODES OF THE INVENTION

Figure 1:
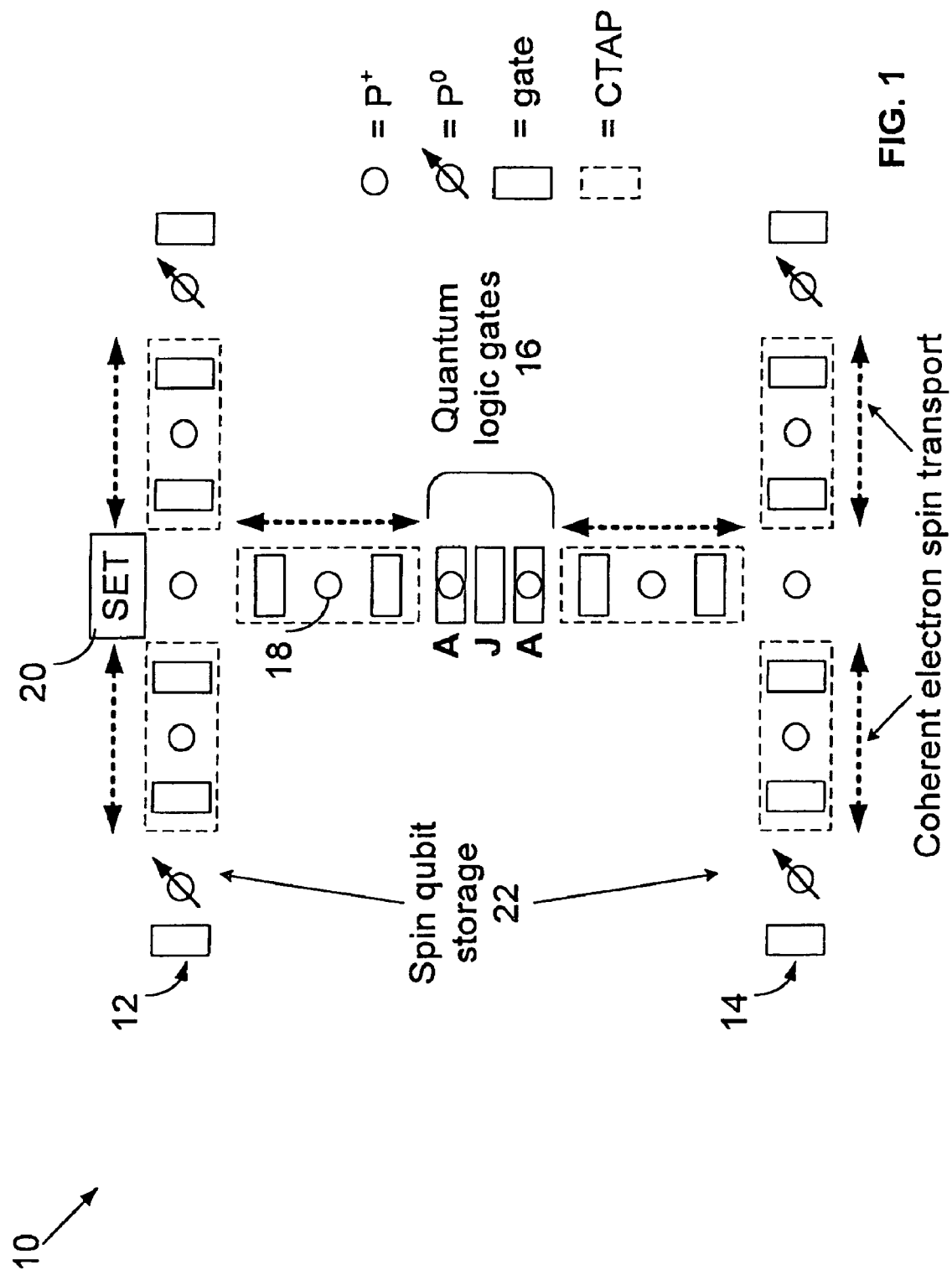
FIG. 1 is a diagram of a fragment of a quasi-two dimensional donor electron spin quantum computer architecture for the case of Si:P.

Referring first to FIG. 1, a quasi-two-dimensional donor architecture fundamental component structure 10 is described. In this example the computer architecture is related to a silicon based quantum computer in which the spin of electrons donated by phosphorus donor atom are used to form the qubits. An upper transport rail 12 and a lower transport rail 14 are arranged in parallel, and are interconnected by a quantum logic gate 16. Physical qubit sites, that is the phosphorus donor atoms, in the architecture are indicated by circles, one of which is identified at 18.

Periodically along the upper 12 and lower 14 transport rails there are sites for the initialization or readout of qubits, or both, such as SET 20. There are also locations for qubit storage 22.

Transport around the architecture is achieved using a buried array of ionized donors $D^+$ (which may be a spin zero species). These donors provide pathways for coherent transport of electron spins for in-place horizontal and vertical shuttling of qubit states. Spin transport could be achieved by adiabatic passage (CTAP) without populating the intervening channel donors [17]. With appropriate donor separations, the shuttling time can be in the nanosecond range for one section.

Logic gate 16 in FIG. 1 involves the canonical A and J gates for electron spin based qubit control at the microsecond level [6], or by direct application of local B-field generator structures [18].

Figure 2A:
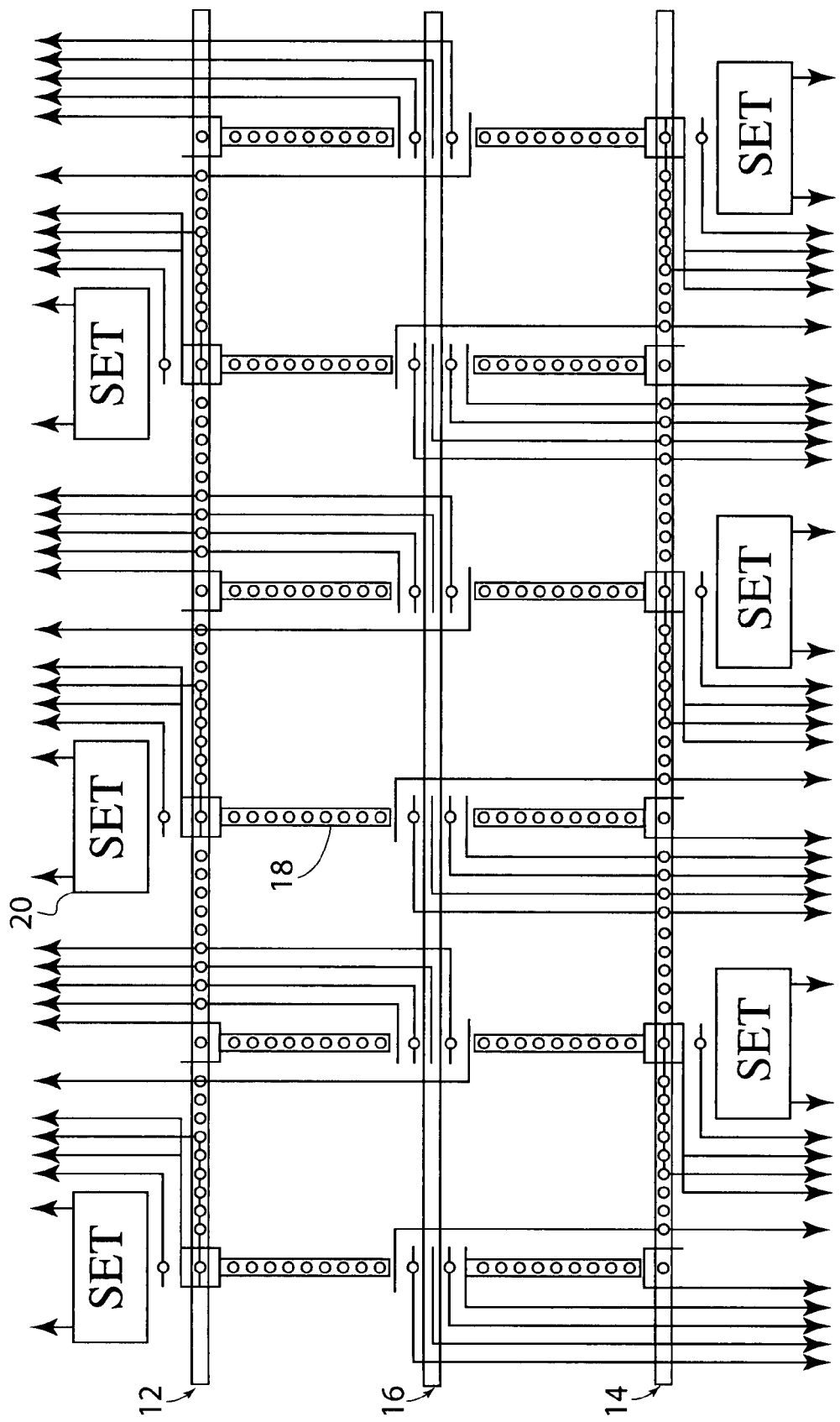
FIG. 2(a) is a diagram of a larger fragment of a quasi-two dimensional donor electron spin quantum computer architecture, showing CTAP rails, or other transport mechanism pathways, for connection to the rest of the computer.

The extension of this scheme to many interactions regions is shown in FIG. 2(a) which shows the basic layout of a quasi-two-dimensional architecture, with interacting qubit pairs, storage regions, transport pathways based on CTAP, and classical driving circuitry. The overall effective linear gate density is able to quickly transport qubits large distances allowing the effective implementation of non-local gates, and supports the physical incorporation of the relatively large SET readout devices 20.

Figure 2B:
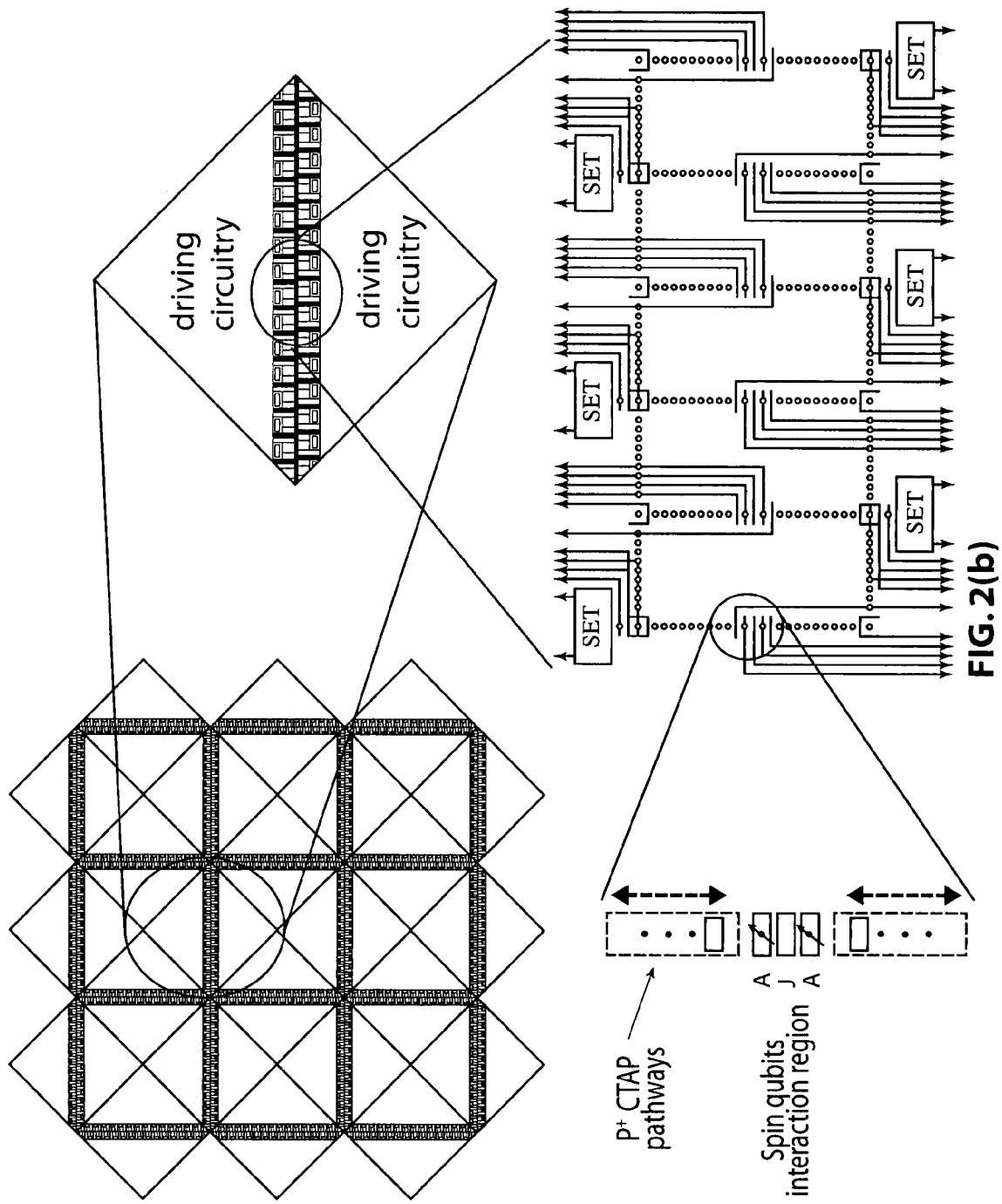
FIG. 2(b) is a diagram showing how the structures of FIGS. 1 and 2(a) are scaled up further with the inclusion of driving circuitry to form shapes that can be combined together in a tiled arrangement.

Further scale up is illustrated in FIG. 2(b) where the arrangement of the driving circuitry forms regular shapes that can be combined together in a tiled arrangement.

Figure 3A:
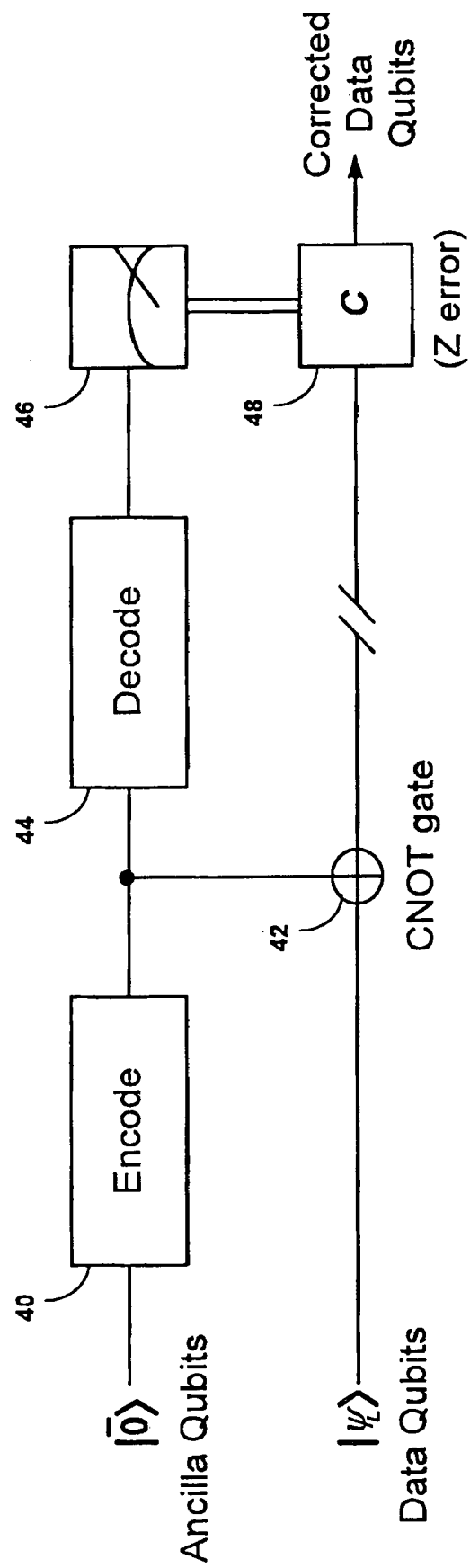
FIG. 3(a) is a schematic diagram of an error corrected quantum computing model for Z-syndrome error extraction.

For error corrected quantum computing, the ancilla qubits are initialised and encoded 40, then they are gated with the data qubits 42, then decoded 44, before being measured 46 and corrected 48; see FIG. 3(a) [9] which shows the schematic diagram for Z-syndrome error extraction and correction.

Figure 3B:
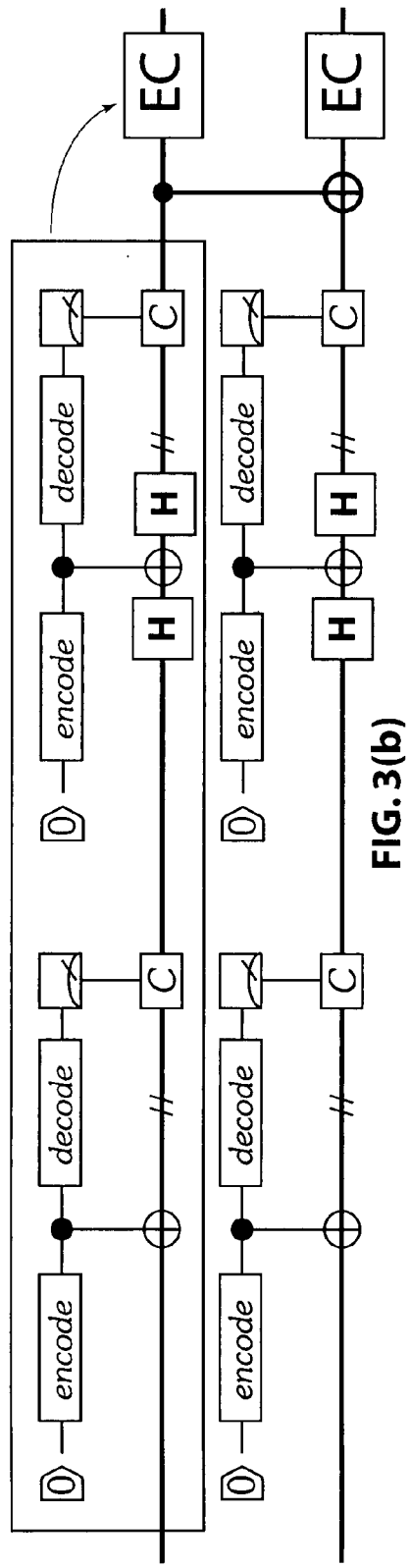
FIG. 3(b) is a schematic diagram of an error corrected quantum computing model for both Z-syndrome X-syndrome error extraction, concatenated four times.
Figure 3C:
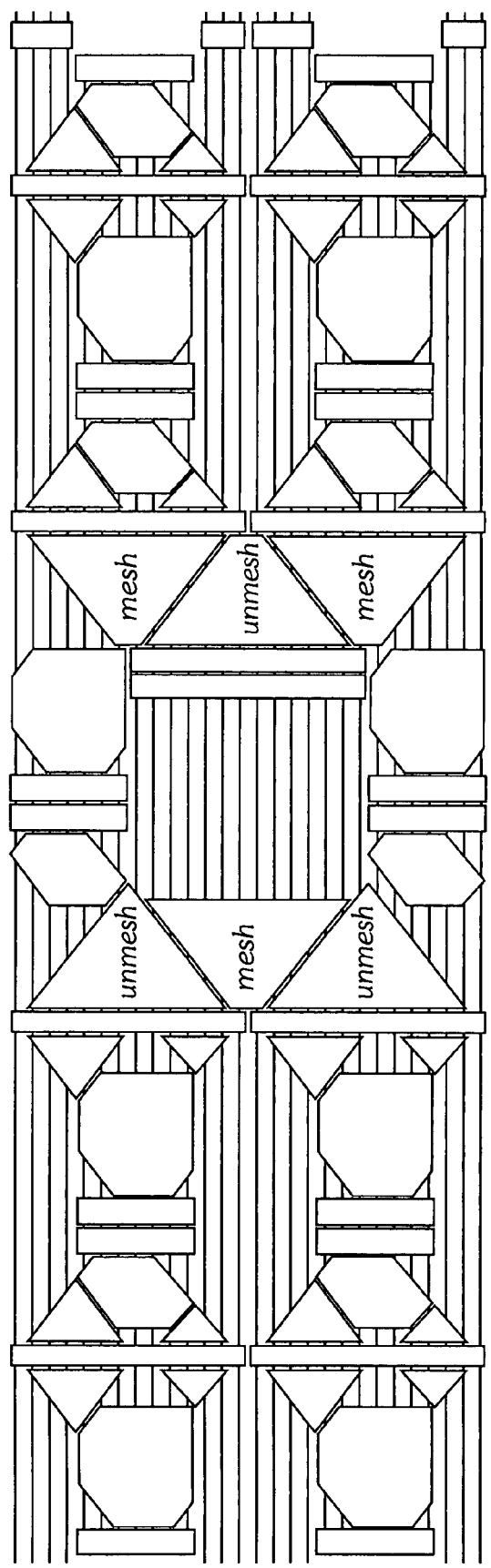
FIG. 3(c) is a schematic diagram of an error corrected quantum computing model concatenated many times.

Further scale us is illustrated in FIG. 3(b) where the model is extended is for both Z-syndrome X-syndrome error extraction, and concatenated four times. FIG. 3(c) is a schematic diagram of an error corrected quantum computing model concatenated many times.

Figure 4:
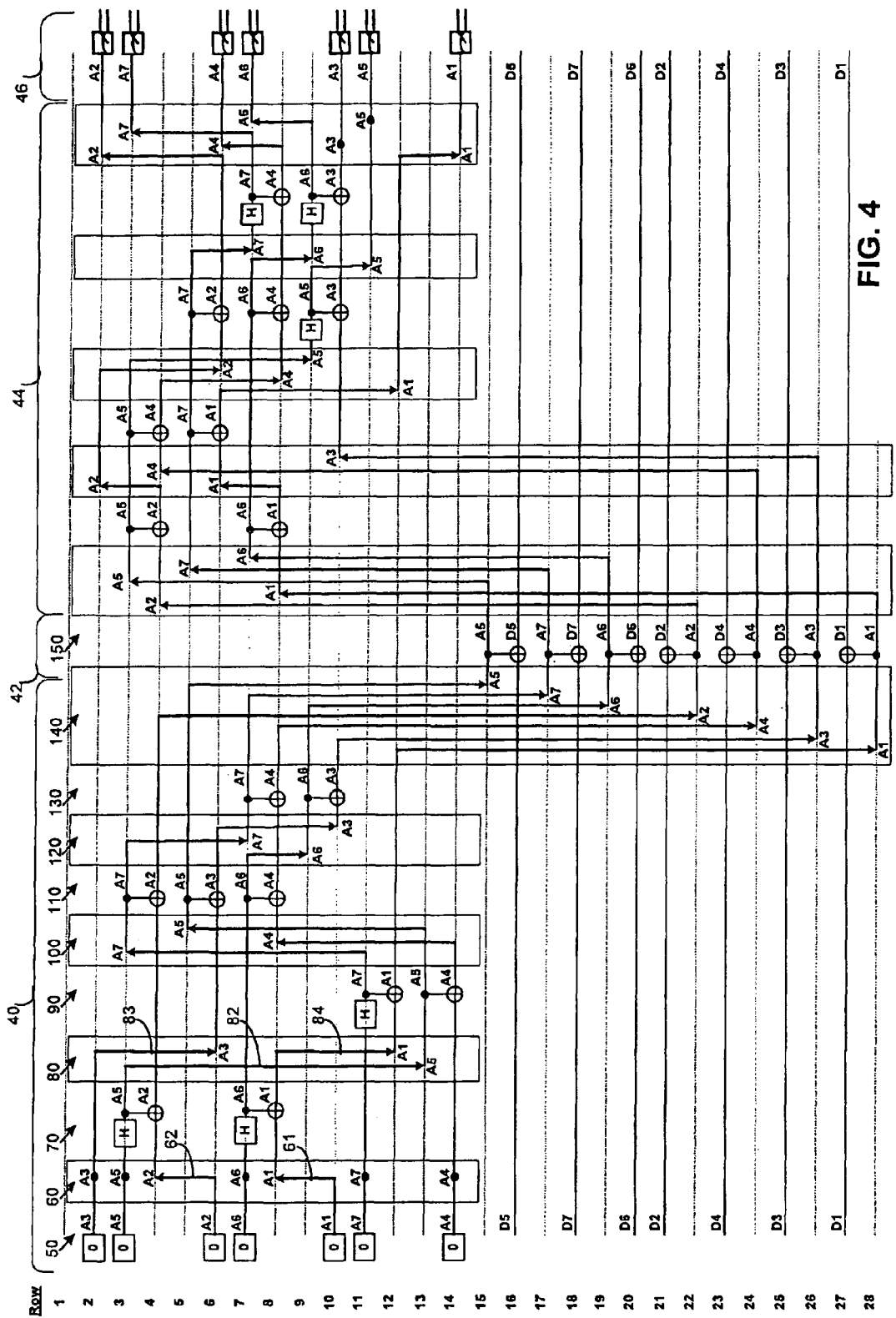
FIG. 4 is a diagram of the temporal movements of qubits during Z-syndrome error extraction taking place on the architecture of FIG. 2 according to the model of FIG. 3.

FIG. 4 illustrates encoding, decoding, gating, measurement and correction operations in time domain. How this process can be applied to the physical architecture of FIGS. 1 and 2. FIG. 4 particularly illustrates the temporal complexity of the process necessary.

Corresponding to FIG. 4 are FIGS. 5 to 15, which will be used to describe the encoding and gating operations for error corrected quantum logic functions which form the basis of quantum computation.

Figure 5:
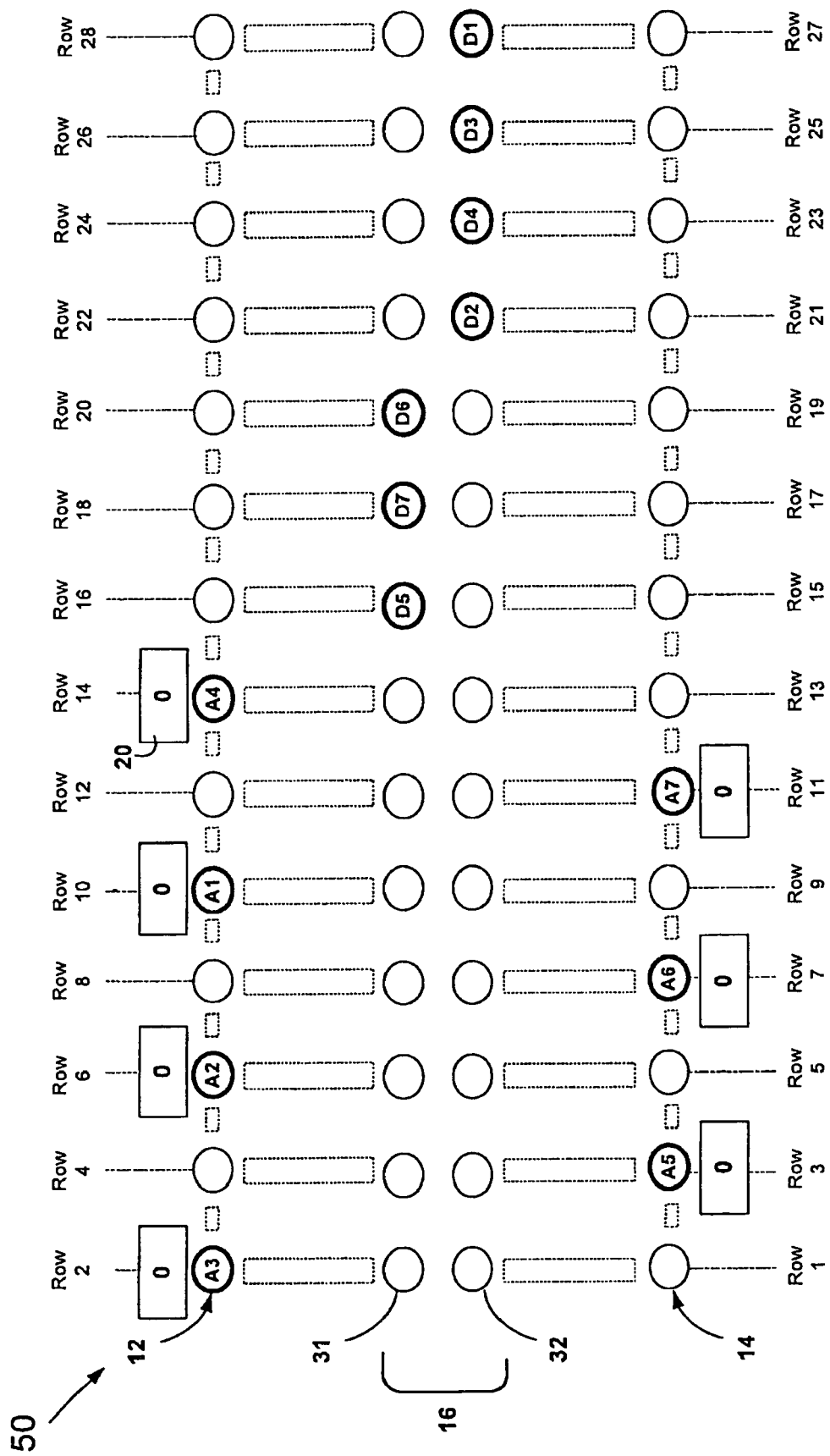
FIG. 5 is a schematic representation of relevant parts of the architecture of FIG. 2, showing the locations where physical data (D) and ancilla (A) qubits are initialised at the first temporal step of FIG. 4.

Referring now to FIG. 5, a simplified schematic representation of the quasi-2-dimensional architecture is shown in which the upper 12 and lower 14 transport rails comprise circular symbols representing qubit sites where initialization and readout occur, and each of these is associated with a gate 16. In particular the sites of the upper rail 12 are associated with upper gate qubit sites 30, and the sites of the lower rail 14 are associated with lower gate qubit sites 32. A number of initialization electrodes are indicated by a box adjacent a site in one of the transport rails; one of these is shown at 20.

The section of the architecture shown in FIG. 5, is reserved for one logical qubit, in this case made up from seven data qubits and seven ancilla qubits. The ancilla qubits are numbered "A1" to "A7", and all the data qubits are numbered "D1" to "D7".

In FIG. 5 seven data qubits and seven ancilla qubits are initialised at locations on the transport rail; shown in FIG. 4 at column 50. All the ancilla qubits are initialised to zero.

Figure 6:
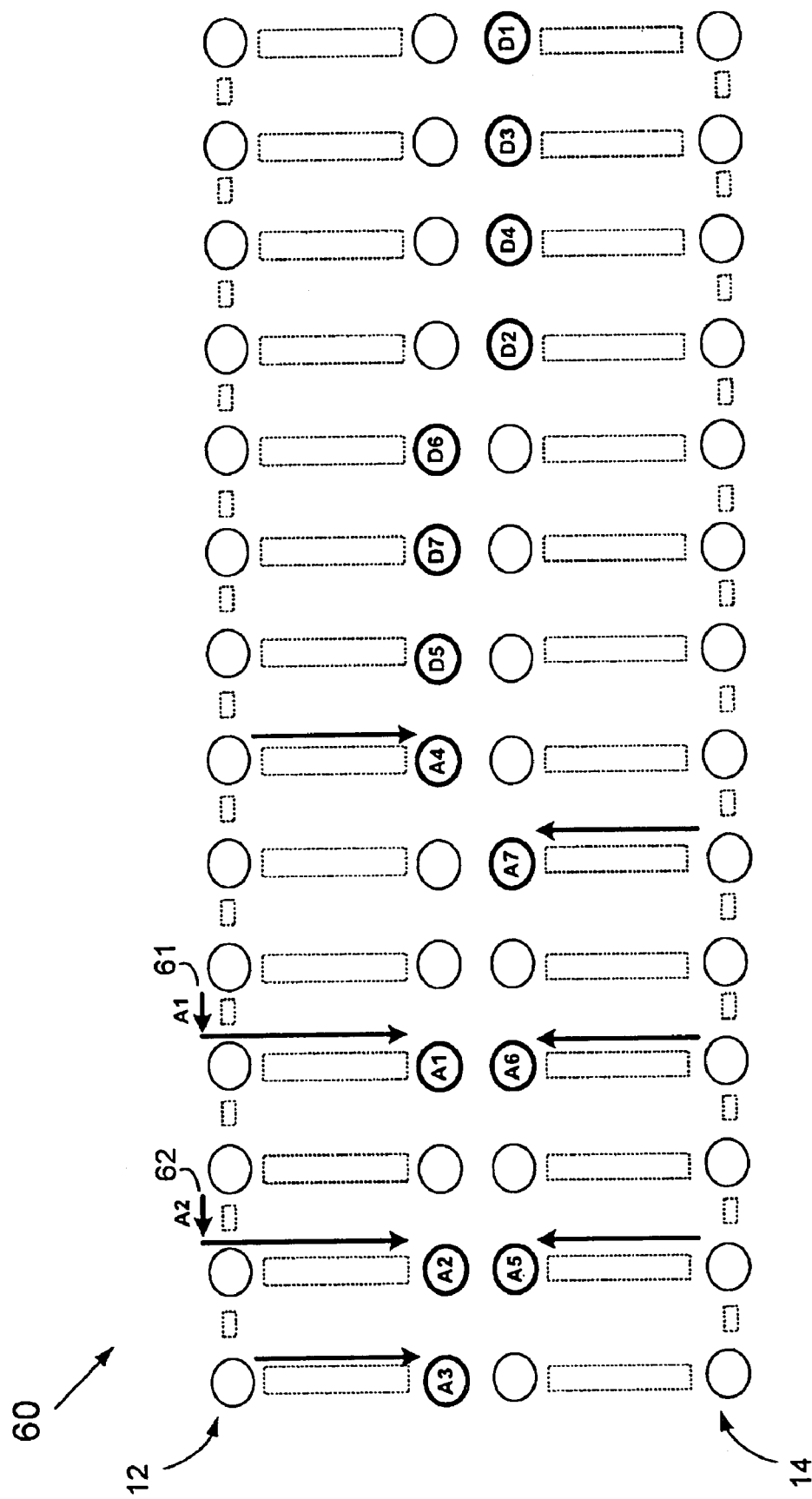
FIG. 6 is a diagram similar to FIG. 5, but showing then next step in the process of FIG. 4.
Figure 7:
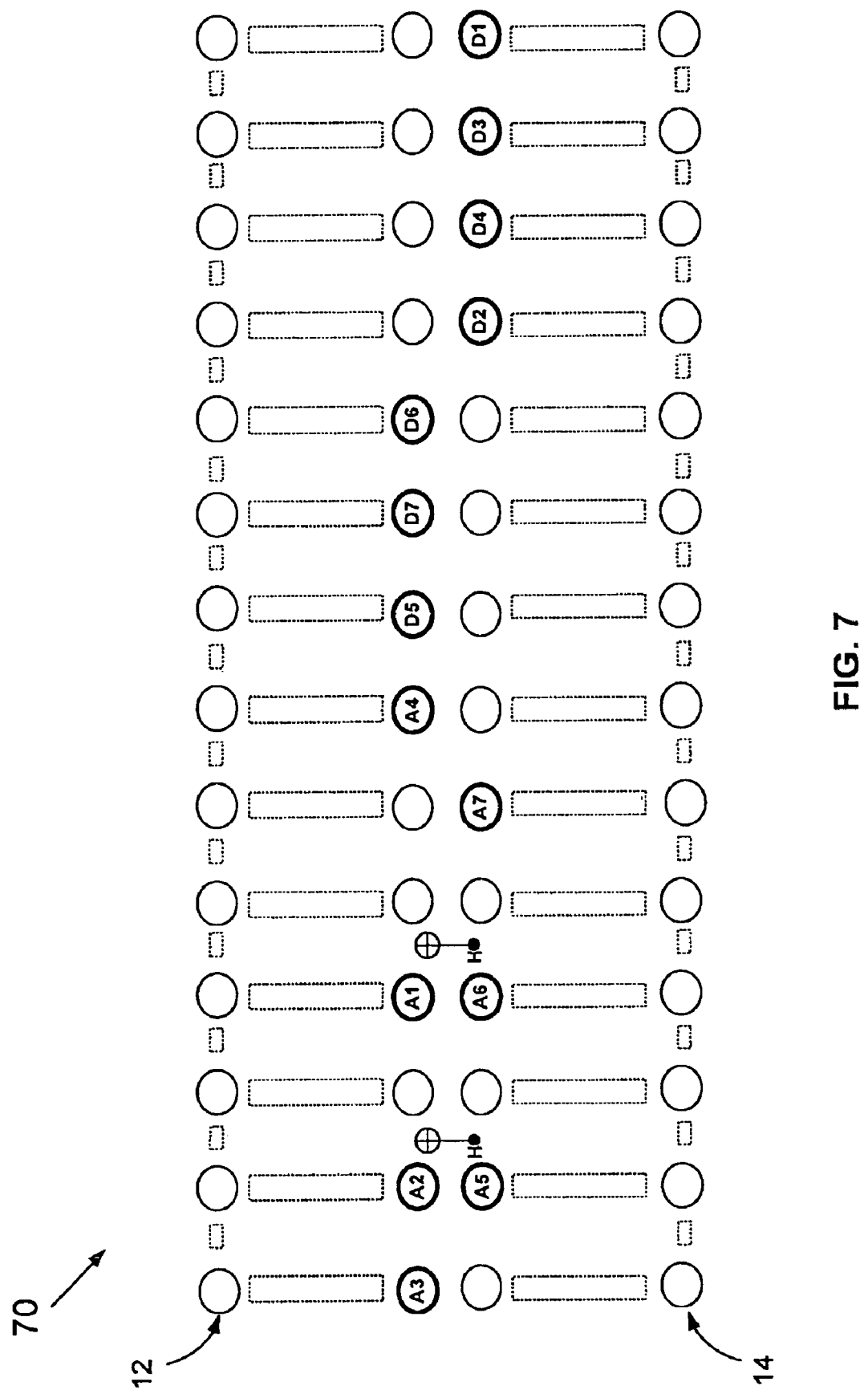
FIG. 7 is a diagram similar to FIG. 5, but showing then next step in the process of FIG. 4.

In FIG. 6, some clock cycles after initialization, ancilla qubits "A1" and "A2" are relocated to corresponding gate sites; indicated in FIGS. 4 and 6 at 61 and 62 respectively. Then, in FIG. 7, ancilla qubits "A5" and "A2", and "A6" and "A1", undergo a logic function, namely hadamard control+ CNOT; shown in FIG. 4 at column 70.

Figure 8:
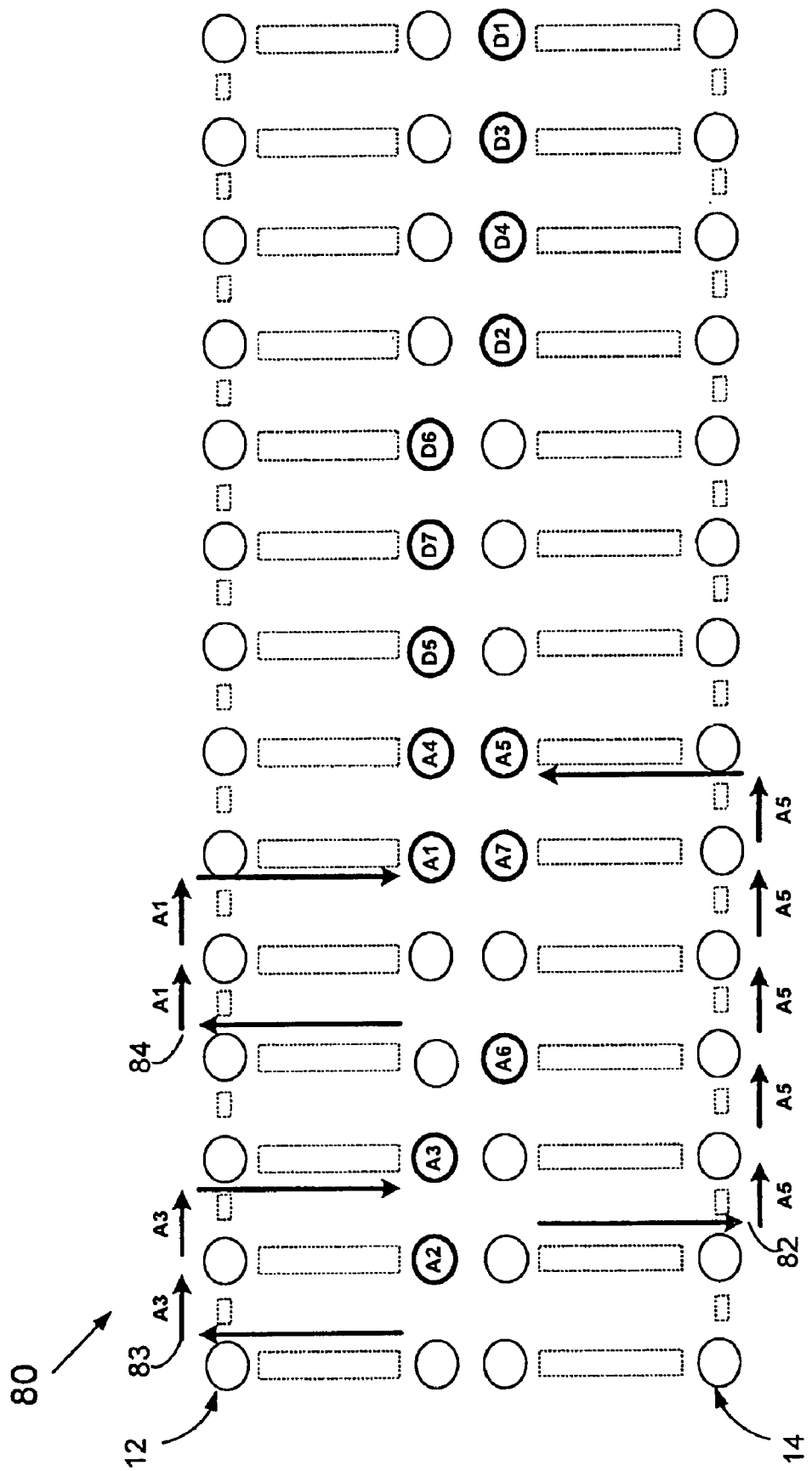
FIG. 8 is a diagram similar to FIG. 5, but showing then next step in the process of FIG. 4.

In FIG. 8, some clock cycles later, ancilla qubit "A5" is moved from the gate, along lower transport line 14 and to a vacant gate site adjacent ancilla qubit "A4". This is indicated in FIG. 4 at column 80 by a vertical downward movement at 82, and in FIG. 8. Ancilla qubit "1" is also moved to a vacant location adjacent data qubit "6" and this is indicated by the vertical downward movement 54. Ancilla qubits "A3" and "A1" also move as indicated at 83 and 84.

Figure 9:
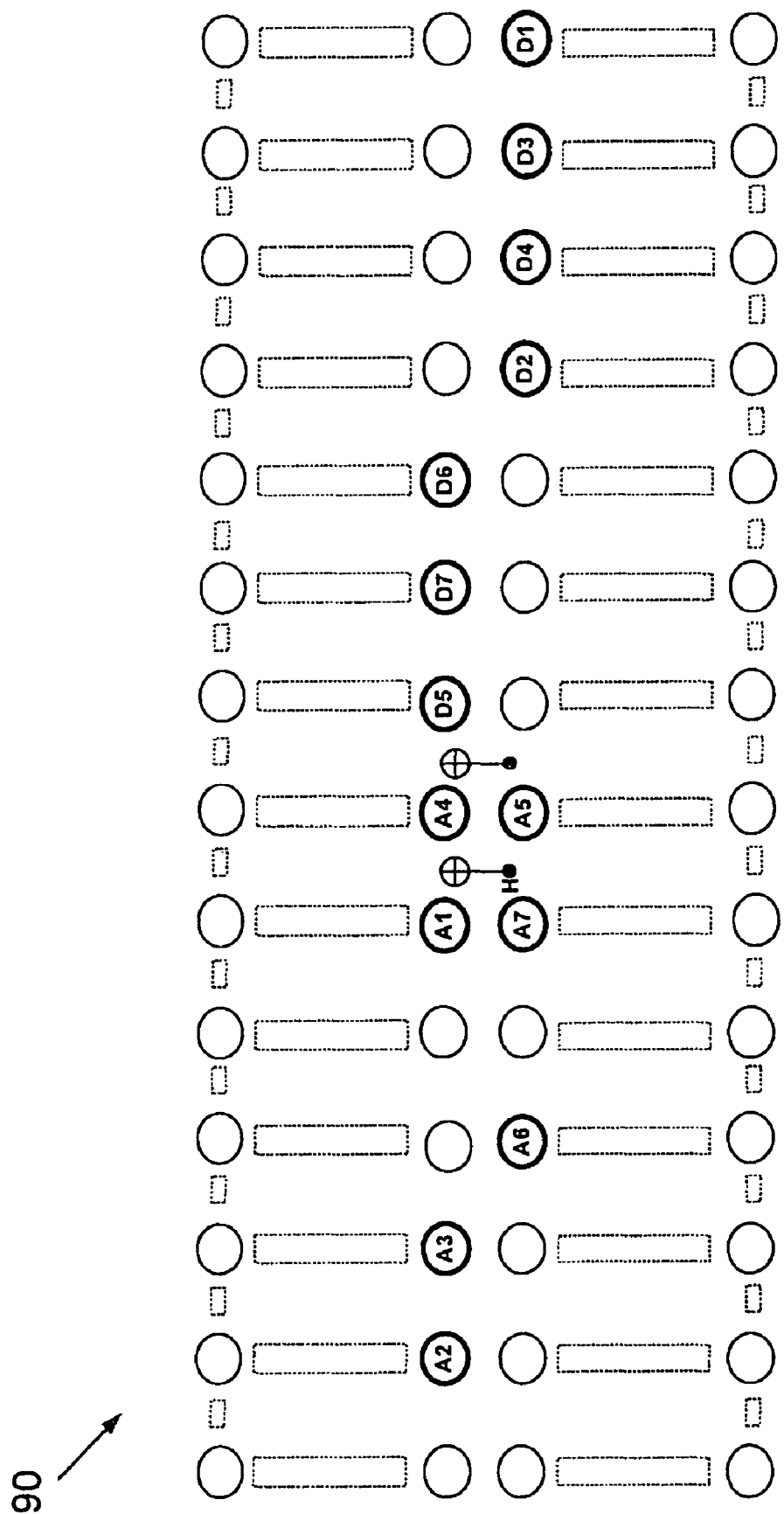
FIG. 9 is a diagram similar to FIG. 5, but showing then next step in the process of FIG. 4.

In FIG. 9, some clock cycles later, at column 90 of FIG. 4, CNOT operations are performed between Ancilla qubits "A4" and "A5". Ancilla qubits "A1" and "A7" simultaneously undergo hadamard+CNOT.

Figure 10:
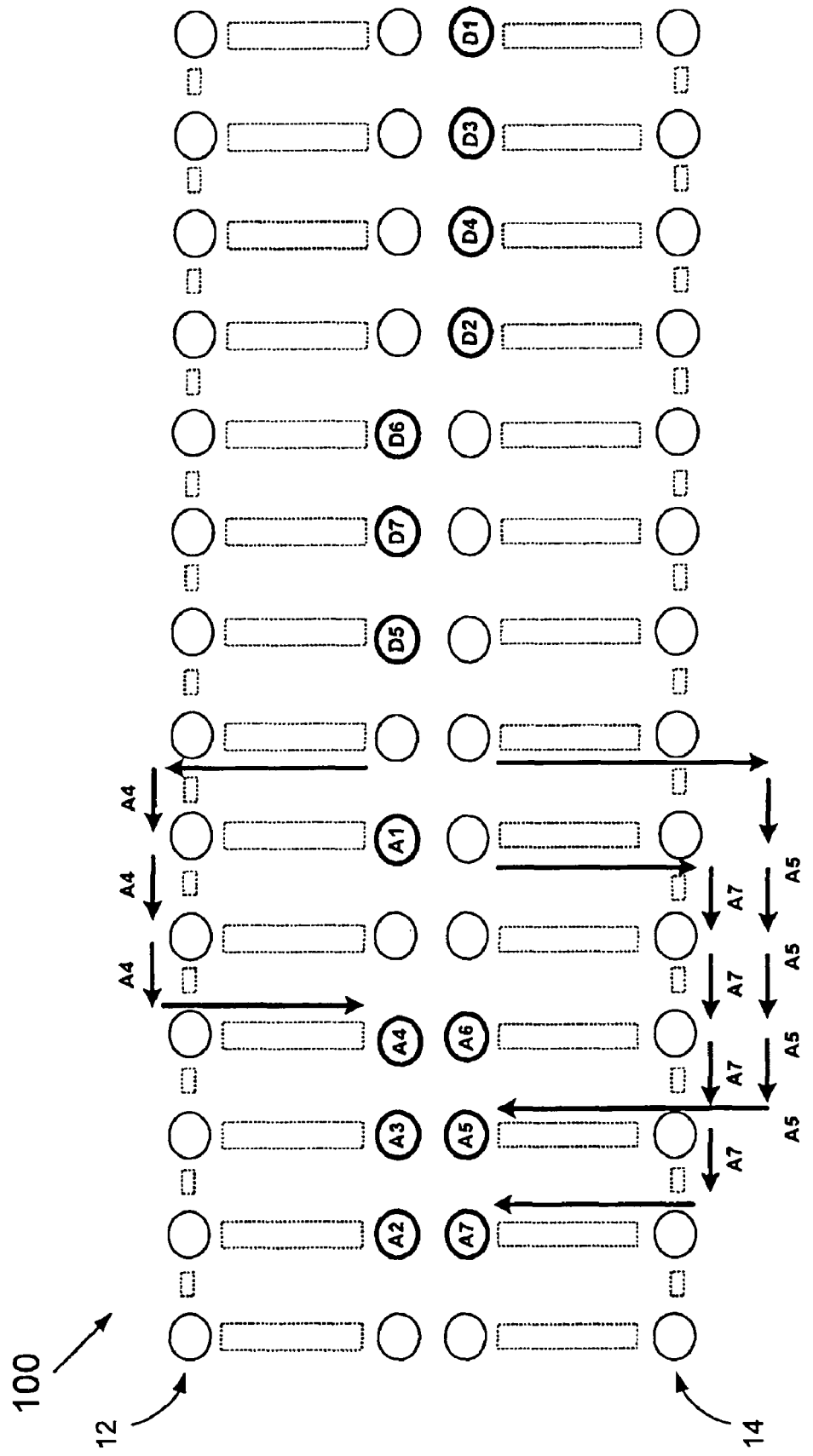
FIG. 10 is a diagram similar to FIG. 5, but showing then next step in the process of FIG. 4.

In FIG. 10, some clock cycles later, at column 100 of FIG. 4, ancilla qubits "A4", "A5" and "A7" are relocated. Ancilla qubit "A4" is now adjacent Ancilla qubit "A6", "A5" is adjacent "A3" and "A7" is adjacent "A2".

Figure 11:
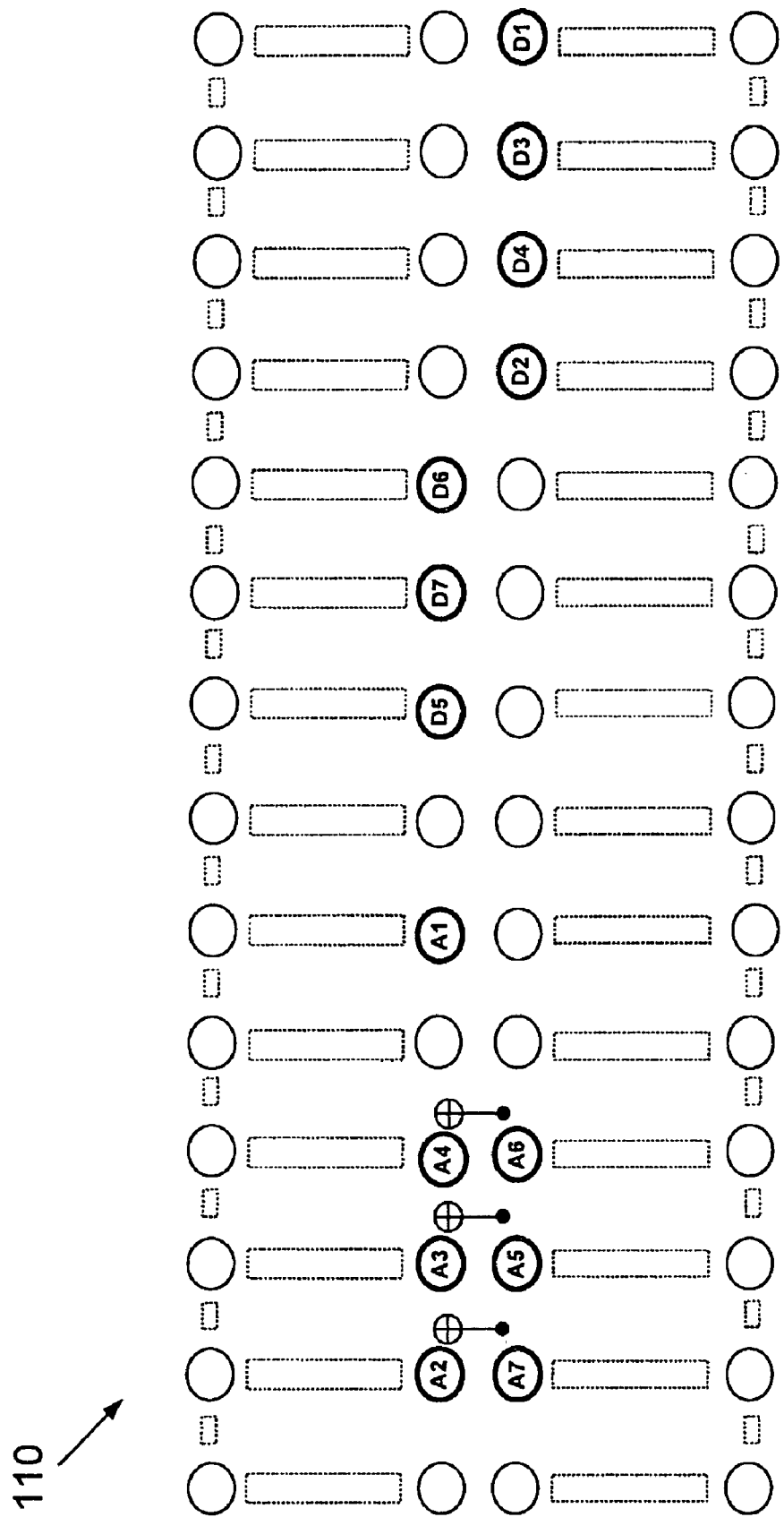
FIG. 11 is a diagram similar to FIG. 5, but showing then next step in the process of FIG. 4.

In FIG. 11, some clock cycles later, at column 110 of FIG. 4, CNOT gate operations are performed between the three pairs of adjacent ancilla qubits.

Figure 12:
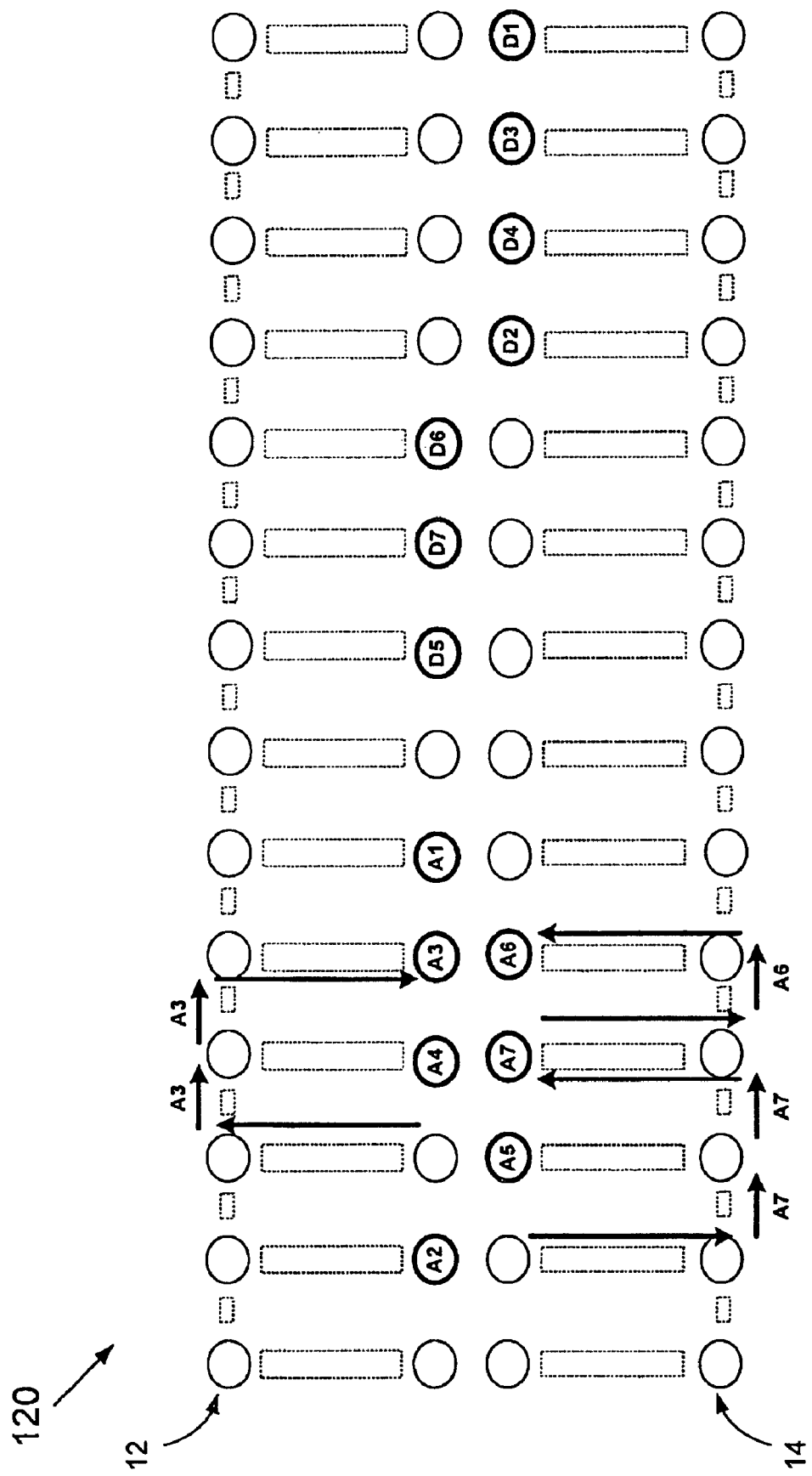
FIG. 12 is a diagram similar to FIG. 5, but showing then next step in the process of FIG. 4.

In FIG. 12, some clock cycles later, at column 120 of FIG. 4, ancilla qubits "A3", "A6" and "A7" are moved to new locations. Qubit "A6" vacates its old position before "A7" can occupy it.

Figure 13:
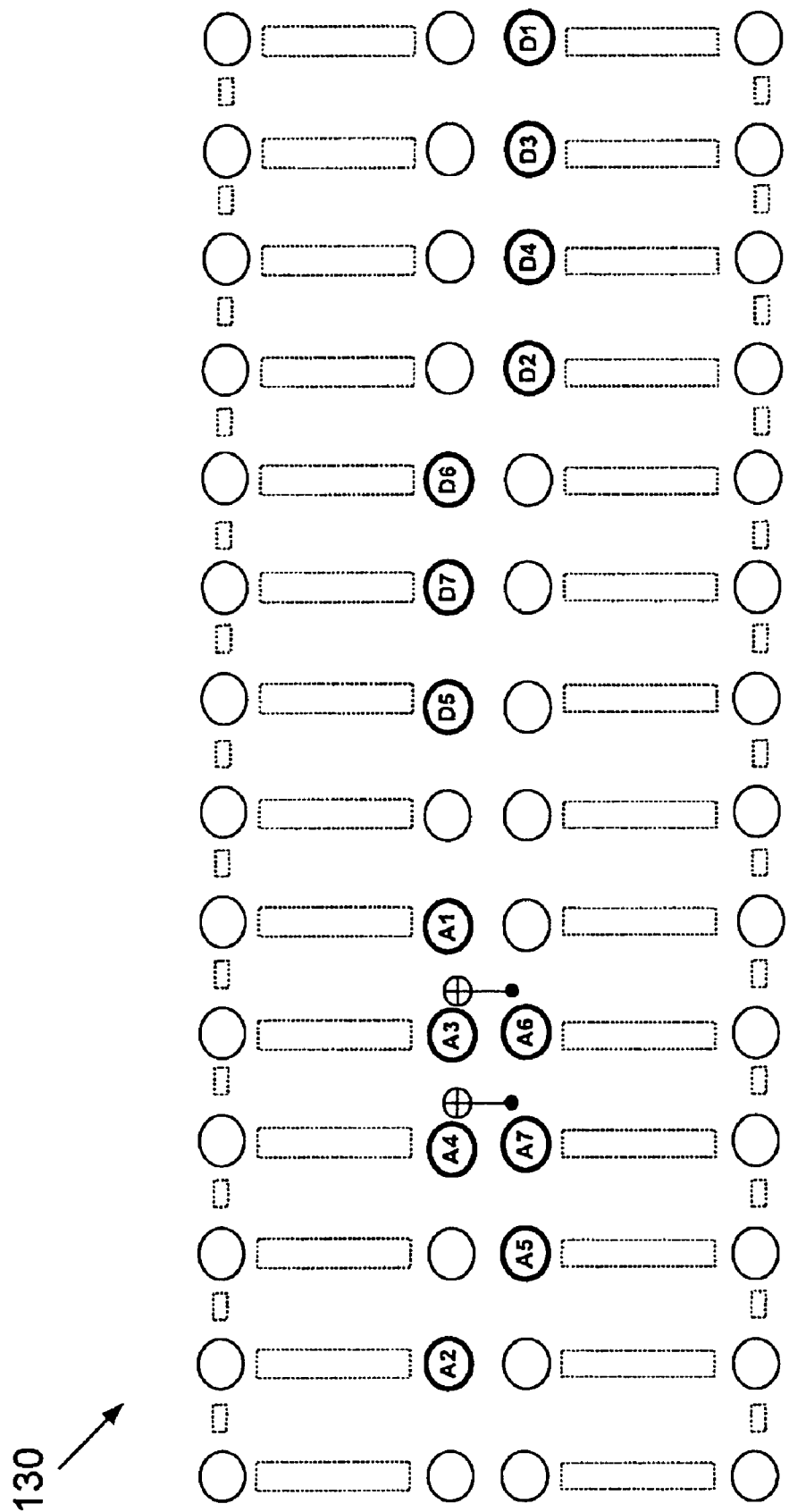
FIG. 13 is a diagram similar to FIG. 5, but showing then next step in the process of FIG. 4.

In FIG. 13, some clock cycles later, at column 130 of FIG. 4, CNOT operations are performed between ancilla qubits "A4" and "A7", and between ancilla qubits "A3 and "A6". The ancilla qubits are now encoded.

Figure 14:
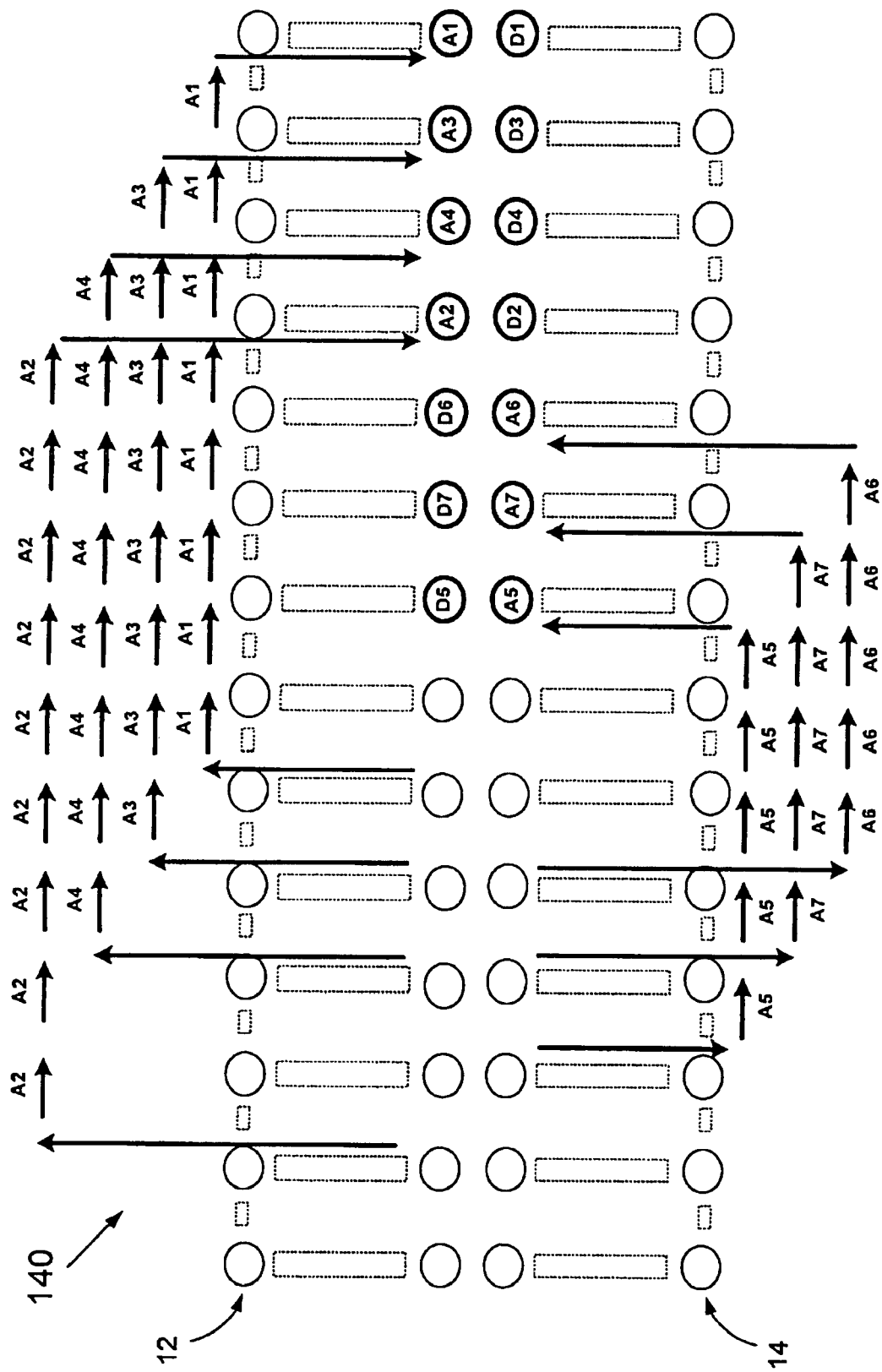
FIG. 14 is a diagram similar to FIG. 5, but showing then next step in the process of FIG. 4.

All the ancilla qubits are now migrated to locations where they are each adjacent a respective data qubit, see FIG. 14 and column 140 of FIG. 4.

Figure 15:
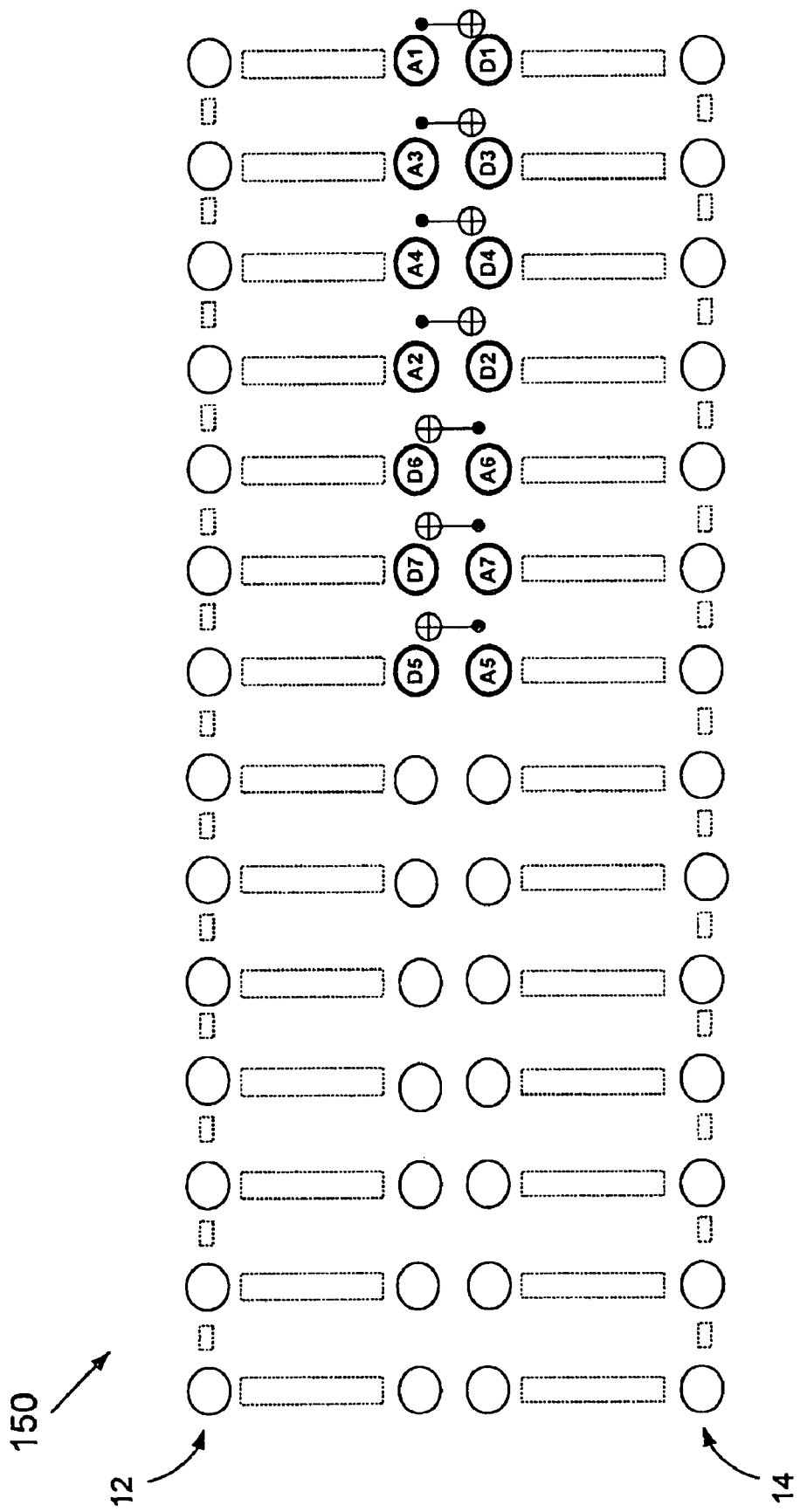
FIG. 15 is a diagram similar to FIG. 5, but showing then next step in the process of FIG. 4.

In FIG. 15 each data qubit is gated (CNOT) with its respective ancilla qubit; see also FIG. 4 column 150.

The remainder of FIG. 4 shows the decoding after this gating between data and ancilla qubits. After decoding the ancilla qubits are measured and the results are used to correct the data qubits that have become corrupted during the encoding stage [9].

Figure 16A:
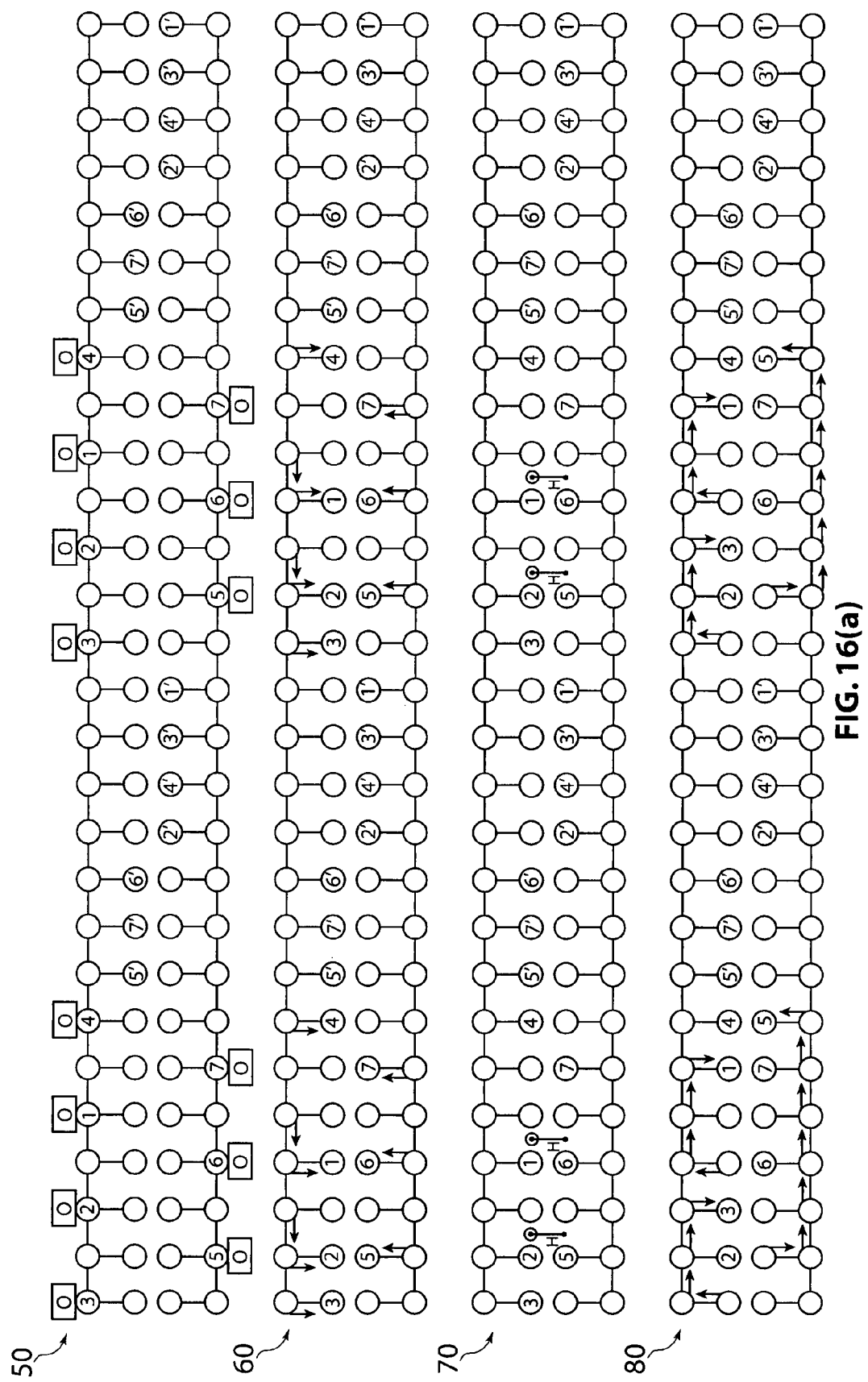
FIGS. 16(a), (b) and (c) is a series of diagrams of the temporal movements required for both Z and X syndrome error extraction.
Figure 16B:
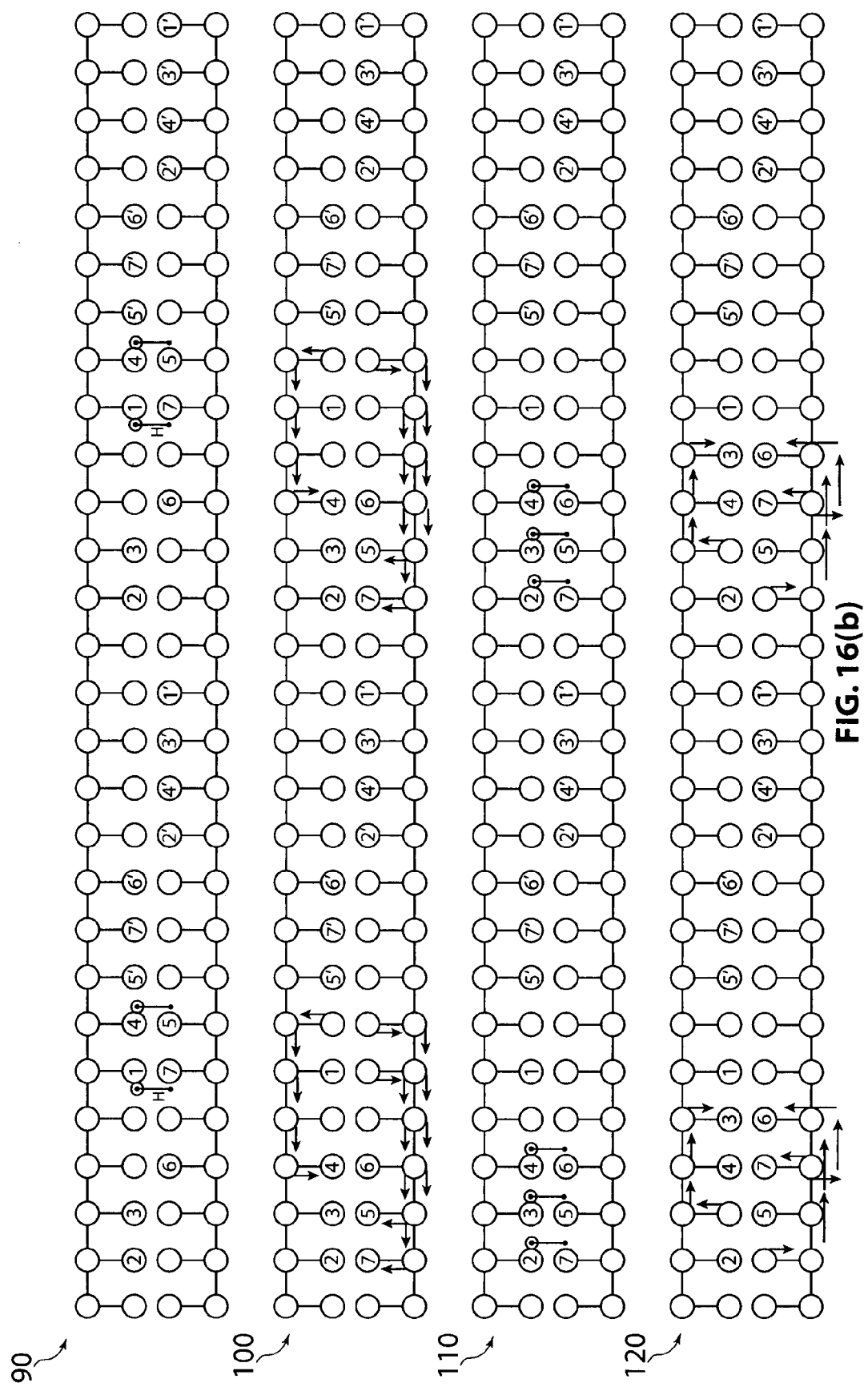
Figure 16C:
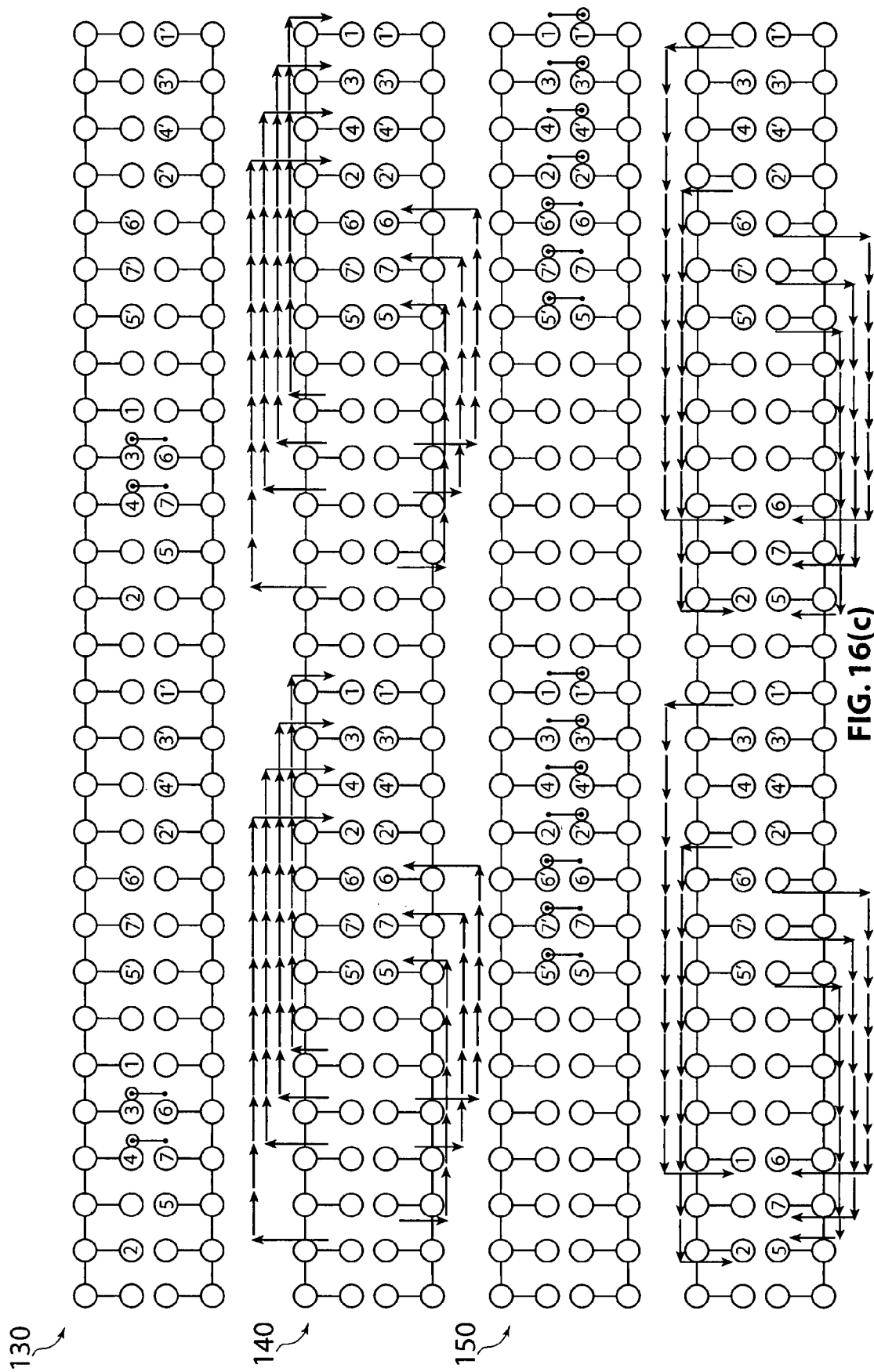

This process so far has described the Z-syndrome error extraction. A similar process with Hadamard gates inserted at the required location describes the X-syndrome extraction. Combing Z and X syndrome extraction results in an error correction block, which when combined with universal gates over logical data blocks allows for fault-tolerant recursively encoded error correction; see FIG. 16(a), (b) and (c) for the entire process.

Qubit loss is monitored by the SET array and recovery and/or re-injection mechanisms can be implemented using controlled qubit reservoirs.

Although the invention has been described with reference to a particular example, it should be appreciated that it could be exemplified in many other forms and in combination with other features not mentioned above. For instance, the technique can be applied to higher dimensional computation with more transport lines and gate sites. Also the technique may be applied to different regimes for encoding logical qubits besides the Steane 7-data qubit code described above.

References, all of which are incorporated herein by reference.

[1] B. E. Kane, Nature (London) 393, 133 (1998).
[2] S. R. Schofield, N. J. Curson, M. Y. Simmons, F. J. Rue J, T. Hallam, L. Oberbeck and R. G. Clark, Physical Review Letters 91, 136104 (2003).
[3] D. N. Jamieson, C. Yang, T. Hopf, S. M. Hearne, C. I. Pakes, S. Prawer, M. Mitic, E. Gauja, S. E. Andresen, F. E. Hudson, A. S. Dzurak and R. G. Clarke, Applied Physics Letters 86, 202101 (2005).
[4] R. Vrigen, E. Yablonovitch, K. Wang, H. W. Jiang, A. Blandin, V. Roychowdhury, T. Mor, and D. DiVincenzo, Physics Review A 62, 012306 (2000).
[5] R. de Sousa, J. D. Gelagdo, and S. Das Sarma. Physics Review A 70, 052304 (2004).
[6] C. D. Hill, L. C. L. Hollenberg, A. G. Fowler, C. J. Wellard, A. D. Greentree, and H.-S. Goan, Physics Review B 72, 045350 (2005)
[7] L. C. L. Hollenberg, A. S. Dzurak, C. Wellard, A. R. Hamilton, D. J. Reilly, G. J. Milburn, and R. G. Clark, Physics Review B 69, 113301 (2004).
[8] A. Steane, in *Decoherence and its Implications in Quantum Computation and Information Transfer*, edited by A. Gonis and P. E. A. Turchi (IOS, Amsterdam 20010), pp. 284-298.
[9] D. P. DiVincenzo, P Aliferis, *Effective fault-tolerant quantum computation with slow measurements*, Physical Review Letters, 98 (2). Art. No. 020501.
[10] Thomas Szkopek et al, *Threshold Error Penalty for Fault Tolerant Quantum Computation with Nearest Neighbour Communication*.
[11] Daniel Gottesman, *Fault-Tolerant Quantum Computation with Local Gates*.
[12] Krysta M Svore, David DiVincenzo and Barbara Herhal, *Noise Threshold for a Fault-Tolerant Two-Dimensional Lattice Architecture*.
[13] A. Steane. Proc. R. Soc. Lond. 452, 2551 (1996) quant-ph/9601029 Multiple Particle Interference and Quantum Error Correction, A. Steane. Phys. Rev. Lett. 78, 2252 (1997) quant-ph/9611027 Active stabilisation, quantum computation and quantum state synthesis
[14] D. Kielpinksy, C. Monroe, and D. J. Wineland, Nature_London_417, 709_2002.
[15] J. M. Taylor, H.-A. Engel, W. Dur, A. Yacoby, C. M. Marcus, P. Zoller, and M. D. Lukin, Nat. Phys. 1, 177_2005].
[16] L. C. L. Hollenberg, A. D. Greentree, A. G. Fowler, and C. J. Wellard, Physical Review B 74, 045311 2006.]
[17] A. D. Greentree, J. H. Cole, A. R. Hamilton, and L. C. L Hollenburg, Phys. Rev. B 70, 235317 (2004).
[18] D. A. Lidar and J. H. Thywissen, J. Appl. Phys. 96, 754 (2004).

The invention claimed is:

1. A process for performing an error corrected quantum logic function on a spatial array of physical qubit sites arranged with a quasi-2-dimensional topology having fundamental component structure comprising:

a first line of physical qubit sites and second line of physical qubit sites, where the first and second lines are arranged in parallel, with the sites of the first line in registration with corresponding sites in the second line; between the first and second lines of physical qubit sites are a plurality of logic function gates, each comprised of a first physical qubit gate site associated with a first physical qubit site in the first line, and a second physical qubit gate site associated with the physical qubit site in the second line that corresponds to the first physical qubit site;

wherein, the temporal process comprises the following steps:

creating a logical qubit in a section of the array by initializing an equal plurality of physical data and ancilla qubits at respective sites of the first and second lines within the section;

clocking each physical qubit site in the section at the same time;

permitting the physical data and ancilla qubits to move to an adjacent site in a clock cycle, provided that no site may contain more than one physical qubit at any time;

controlling the sites to achieve movement of ancilla qubits in the array to bring pairs of the ancilla qubits to respective first and second physical gate sites of logic function gates over the course of a number of clock cycles;

permitting logic operations to be performed at logic function gates which have both of their gate sites occupied by a physical ancilla qubit;

controlling the gate sites of the logic function gate to achieve the logic operation;

controlling the sites to achieve movement of the qubits in the array to bring pairs of all the data and ancilla qubits to respective logic function gates over the course of a number of clock cycles;

controlling the gate sites of the logic function gate to achieve the logic operation between each pair of data and ancilla qubits;

controlling the sites to achieve movement of the qubits in the array to bring all the data and ancilla qubits to respective sites where they can be read out; and, using the values of the ancilla qubits read out to correct errors arising in the data qubits they have been gated with.

2. A process according to claim 1, wherein initialization and readout sites are provided in the first and second lines of sites for the initialization and readout of physical data and ancilla qubits.

3. A process according to claim 1, wherein transport sites are provided in the first and second lines of sites and between the first and second lines of sites and gate sites.

4. A process according to claim 1, wherein transport of physical qubit between initialization, readout and gate sites takes place by a mechanism involving coherent transport by adiabatic passage (CTAP).

5. A process according to claim 1, wherein transport of physical qubit between initialization, readout and gate sites takes place by a mechanism involving coherent transport by logical SWAP operations.

6. A process according to claim 1, wherein transport of physical qubit between initialization, readout and gate sites takes place by a mechanism involving coherent transport by direct electric field induced transport.

7. A process according to claim 1, wherein any one of the following logic operations is used:
CNOT,
hadamard control+CNOT,
CNOT+hadamard control,
hadamard target+CNOT+hadamard target
hadamard target+CNOT+SWAP+hadamard target
SWAP.

8. A process according to claim 1, wherein the logical qubits are constructed using a Steane code.

9. A process according to claim 1, wherein, the qubits are realised in silicon.

10. A process according to claim 9, wherein the qubits are realised as nuclear spin qubits, electron spin qubits or charge qubits.

11. A process according to claim 1, wherein the qubits are realised as ions in ion-traps, superconducting qubits, or electron spins in solid-state quantum dots.

12. A fundamental component structure of a quasi-2-dimensional quantum computer architecture for performing an error corrected quantum logic function, the structure comprising:

a first line of physical qubit sites and second line of physical qubit sites, where the first and second lines are arranged in parallel, with the sites of the first line in registration with corresponding sites in the second line;

initialization and readout sites are provided in the first and second lines of sites for the initialization and readout of physical data and ancilla qubits;

between the first and second lines of physical qubit sites are a plurality of logic function gates, each comprised of a first physical qubit gate site associated with a first physical qubit site in the first line, and a second physical qubit gate site associated with the physical qubit site in the second line that corresponds to the first physical qubit site;

transport sites are provided in the first and second lines of sites and between the first and second lines of sites and gate sites.

13. A structure according to claim 12, further including classical driving circuitry arranged to form regular shapes that can be combined together in a tiled arrangement.

* * * * *